US006720906B2

(12) United States Patent
Szeto et al.

(10) Patent No.: US 6,720,906 B2
(45) Date of Patent: Apr. 13, 2004

(54) CONSTANT ALTITUDE WEATHER AND ALL WEATHER DISPLAY

(75) Inventors: Roland Y. Szeto, Seattle, WA (US); Bill G. Cornell, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/079,477

(22) Filed: Feb. 19, 2002

(65) Prior Publication Data

US 2003/0011505 A1 Jan. 16, 2003

Related U.S. Application Data

(60) Provisional application No. 60/305,442, filed on Jul. 13, 2001, and provisional application No. 60/305,349, filed on Jul. 12, 2001.

(51) Int. Cl.[7] .............................. G01S 13/95; G01S 7/04; G01S 7/20
(52) U.S. Cl. .................... 342/26; 342/175; 342/176; 342/180; 342/195
(58) Field of Search ................................. 701/300, 301, 701/302; 342/27, 28, 29, 30, 31, 32, 41, 89, 90, 91, 92, 93, 118, 119, 175–186, 195, 25, 26

(56) References Cited

U.S. PATENT DOCUMENTS

| 4,967,200 | A | * | 10/1990 | Arambepola ................. 342/25 |
| 5,059,967 | A | | 10/1991 | Roos |
| 5,202,690 | A | | 4/1993 | Frederick |
| 5,311,184 | A | | 5/1994 | Kuntman |
| 5,331,330 | A | * | 7/1994 | Susnjara ...................... 342/26 |
| 5,828,332 | A | | 10/1998 | Frederick |

OTHER PUBLICATIONS

K. Inoue et al., "A 10 Mb Frame Buffer Memory with Z–Compare and A–Blend Units"; IEEE Journal of Solid State Circuits; (vol. 30, No. 12; Dec. 1995), pp. 1563–1568.*

* cited by examiner

Primary Examiner—Bernarr E. Gregory
(74) Attorney, Agent, or Firm—Honeywell Int'l Inc.

(57) ABSTRACT

A system, method, and computer program product for allowing a pilot to view weather hazards at a selected altitude or within a range of altitudes. The weather display system includes a memory, a processor, and a display device. The memory stores radar return data in a three-dimensional buffer. The processor is coupled to the memory and retrieves radar return data stored in the three-dimensional buffer that corresponds to an altitude. The processor generates an image of the retrieved radar return data. The display device displays the generated image.

20 Claims, 7 Drawing Sheets

CONSTANT ALTITUDE WEATHER AND ALL WEATHER DISPLAY

This application claims priority from co-pending U.S. Provisional Patent Application No. 60/305,349, filed Jul. 12, 2001, and from co-pending U.S. Provisional Patent Application No. 60/305,442, filed Jul. 13, 2001.

This invention relates to copending applications U.S. patent application Ser. No. 10/080,197, U.S. patent application Ser. No. 10/080,180, and U.S. patent application Ser. No. 10/080,192, all filed on Feb. 19, 2002.

BACKGROUND OF THE INVENTION

With traditional weather radar systems, the data displayed to the pilot is from a single tilt of the radar antenna. In the case where the antenna is tilted up or down from the horizon the data being displayed has been collected from along the antenna beam from points that exist within a large range of altitudes. For instance, if the antenna is tilted down more than a few degrees, the resulting display consists of data collected at the aircraft altitude at close range to the ground at long range. Not all of this altitude range may be of interest to the pilot. Even in the case of a zero degree tilt, the data collected is from multiple altitudes due to the curvature of the earth. The resulting display of such data can be confusing to a pilot who is interested in information concerning a single altitude.

Also, as a result of the above described weather radar system, the flight crew may have the radar pointing a desired direction yet miss scanning a large volume of sky and any storms that exist in that volume. Therefore, there exists a need to provide flight crew with viewing options that are more easily interpretable.

SUMMARY OF THE INVENTION

The present invention comprises a system, method, and computer program product for allowing a pilot to view weather hazards at a selected altitude or within a range of altitudes. The weather display system includes a memory, a processor, and a display device. The memory stores radar return data in a three-dimensional buffer. The processor is coupled to the memory and retrieves radar return data stored in the three-dimensional buffer that corresponds to an altitude. The processor generates an image of the retrieved radar return data. The display device displays the generated image.

In accordance with further aspects of the invention, the three-dimensional buffer is aircraft referenced in an x and y direction and altitude above the earth referenced in a z direction.

In accordance with other aspects of the invention, a user interface is coupled to the processor for allowing a user to select the altitude used by the processor.

In accordance with still further aspects of the invention, the system includes a memory for storing radar return data in a three-dimensional buffer, a processor, and a display device. The processor retrieves radar return data stored in the three-dimensional buffer based on a range of altitudes, and generates an image of the retrieved radar return data. The display device displays the generated image.

As will be readily appreciated from the foregoing summary, the invention provides a pilot with the ability to view radar data in various user friendly views.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention is a weather radar system that allows the pilot to view weather hazards at a selected altitude or within a range of altitudes.

Figure 1:
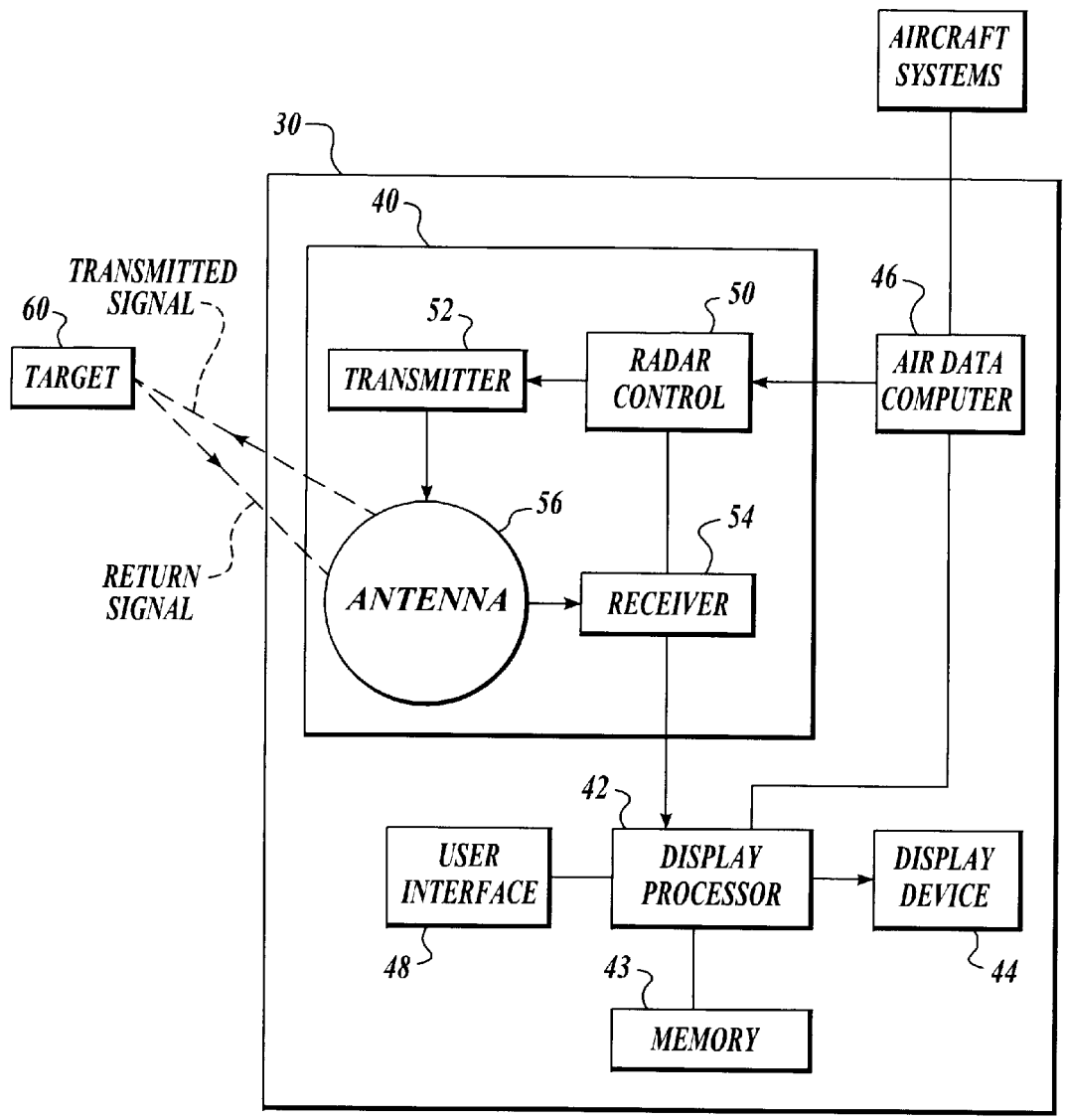
FIG. 1 is a block diagram of a system formed in accordance with an embodiment of the present invention.

FIG. 1 illustrates an example system 30 formed in accordance with the present invention. The system 30 includes a weather radar system 40, a display processor 42, memory 43, a display device 44, an air data computer 46, and user interface 48 coupled to the display processor 42. The display processor 42 is electrically coupled to the radar system 40, the display device 44, the air data computer 46, and the memory 43. An example of the radar system 40 includes a radar controller 50, a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from the air data computer 46, a Flight Management System (FMS), Inertial Navigation System (INS), and/or Global Positioning System (GPS). The air data computer 46 generates air data based on signals received from various aircraft flight systems. The radar system 40 transmits radar signals from the antenna 56 into space and receives return signals (reflectivity values) if a target 60 is contacted by the transmitted radar signal. Preferably, the radar system 40 digitizes the return signals and sends the digitized signals to the display processor 42. The display processor 42 translates the received return signals for storage in a three-dimensional buffer in the memory 43. The display processor 42 then generates a two-dimensional image for presentation on the display device 44 based on any control signals sent from the user interface 48 or based on settings within the processor 42. An example setting is one that is a preset parameter that is an adjustable altitude value relative to aircraft's current altitude.

The translated return signals (return data), as determined by the radar system 40 or processor 42, identify certain weather targets, such as rain/moisture, windshear, or turbulence. The type of weather target identified is based on a corresponding present algorithmic interpretation of the reflectivity values. The pilot selects the type of weather identified using the user interface 48.

Figure 2:
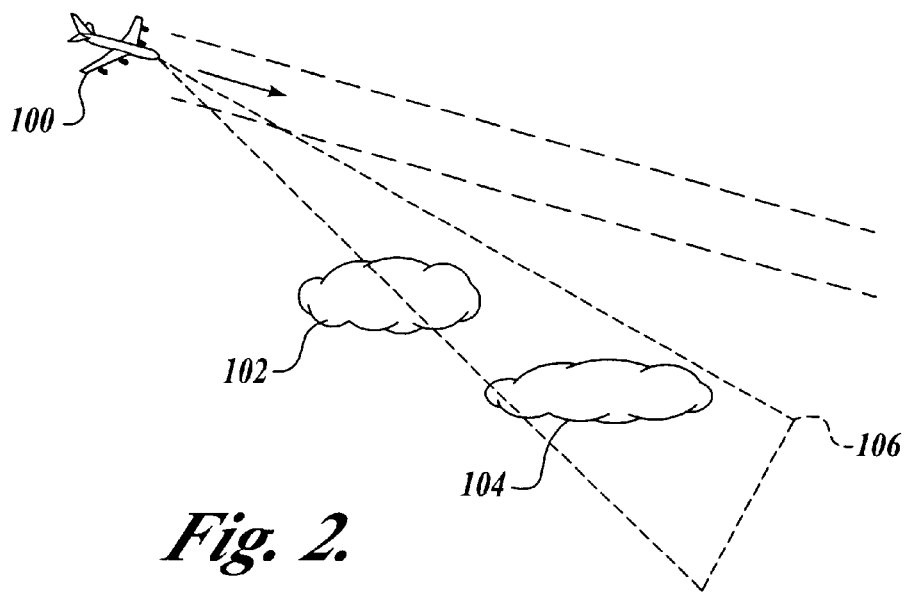
FIG. 2 is a side view of a volume of space in front of an airplane.
Figure 3:
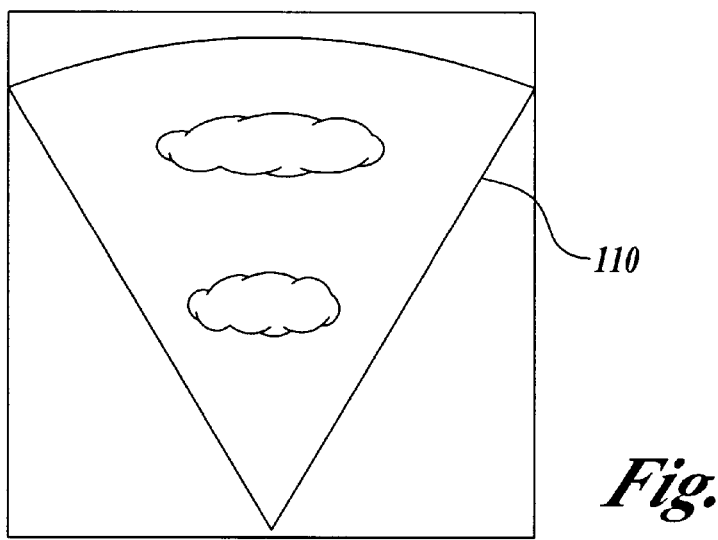
FIG. 3 is a plan position view of a tilted sweep from the airplane shown in FIG. 2.

FIG. 2 illustrates a side view of an area of space in front of an airplane 100. Below and at some tilt angle in front of the airplane 100 are two identified weather hazards 102 and 104. The hazards 102 and 104 are at least in part located in a sweep of the radar identified by area 106 that is at some specified tilt angle. FIG. 3 illustrates a plan view image 110 generated by the processor 42 according to the radar sweep through area 106 as shown in FIG. 2. This plan view image 110 clearly shows that there are hazards in front of the airplane 100. However, it takes some mental processing by the pilot to understand that the hazards 102 and 104 are actually irrelevant hazards if the airplane 100 maintains a level flight path which is at an altitude above both of the hazards 102 and 104. They are irrelevant because they are at a lower altitude than the aircraft. Therefore, the pilot may request or actually make a flight plan change if the pilot thinks that the corresponding selected tilt angle of the plan view image 110 is the same as the aircraft's altitude.

Figure 4:
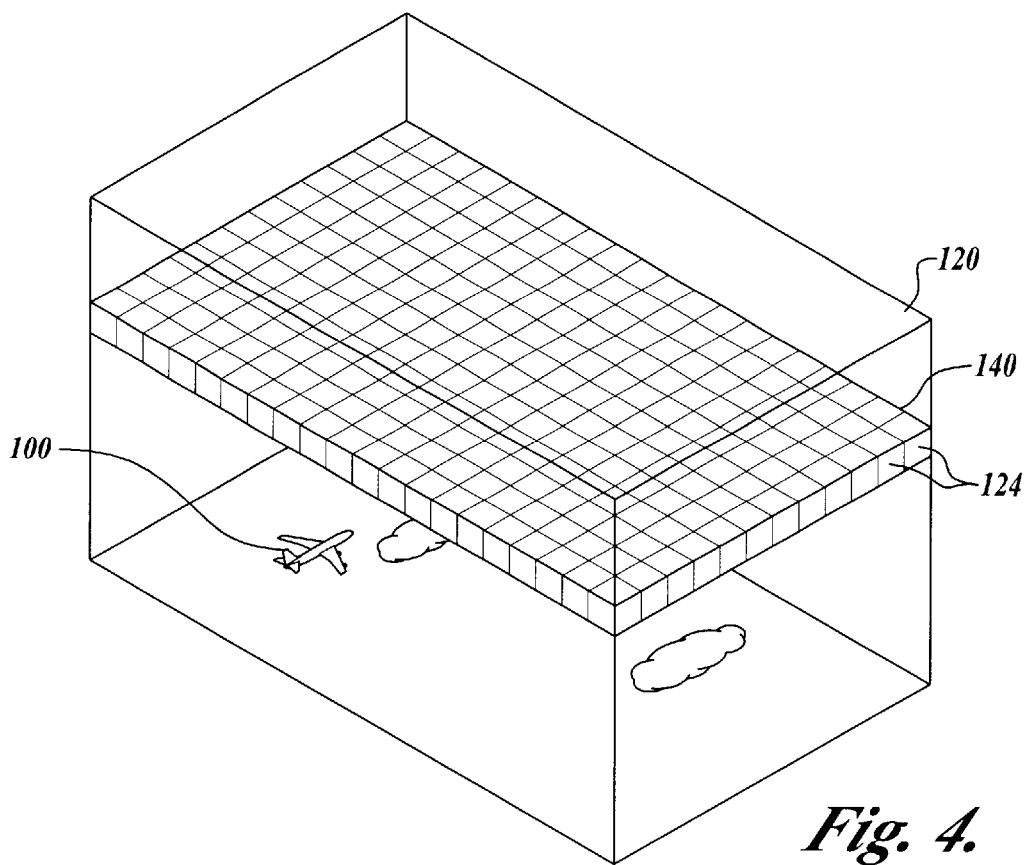
FIG. 4 is a perspective view of a three-dimensional buffer as it relates to FIG. 2.
Figure 5:
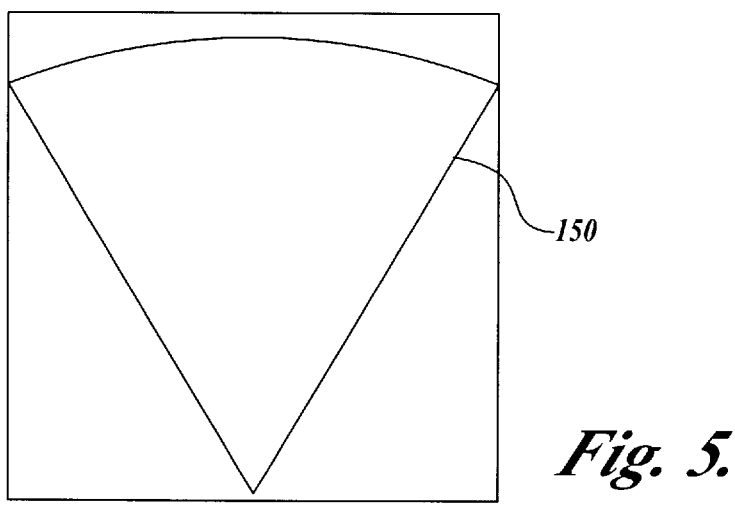
FIG. 5 is a plan view of a selected altitude of the situation shown in FIG. 2 using the constructs shown in FIG. 4.

FIG. 4 illustrates a perspective view of the airplane 100 as it relates to radar return data stored in a three-dimensional buffer 120. An example system for generating and storing radar return data into a three-dimensional buffer is illustrated and described above in FIG. 1 and in U.S. patent application Ser. No. 10/080,197, filed Feb. 19, 2002, which is hereby incorporated by reference. U.S. Pat. No. 5,059,967 to Roos describes an apparatus and method for displaying weather information and is also hereby incorporated by reference. The three-dimensional buffer 120 is preferably a circular buffer that includes voxels 124 that store radar return data from the radar system 40, time information based on when the radar return data was stored in the voxel, and any other pertinent radar related information. In this embodiment, if the pilot of the airplane 100 desires to see only the radar return information at a certain altitude, the pilot using the user interface 48 selects the desired altitude. The processor 42 then extracts the return data stored in the voxels of the buffer that correspond to the pilot selected altitude and generates an image for display. For example, when the pilot chooses to generate an image of all radar return data for 20,000 ft. MSL, the processor 42 extracts the return data stored in the voxels 124 in a 20,000 ft. voxel plane 140. A plan view image 150 shown in FIG. 5 is the image generated by the processor 42 of the extracted data from the voxel plane 140. The plan view image 150 quickly illustrates to the pilot that no hazards exist on the altitude that the pilot has selected.

Figure 6:
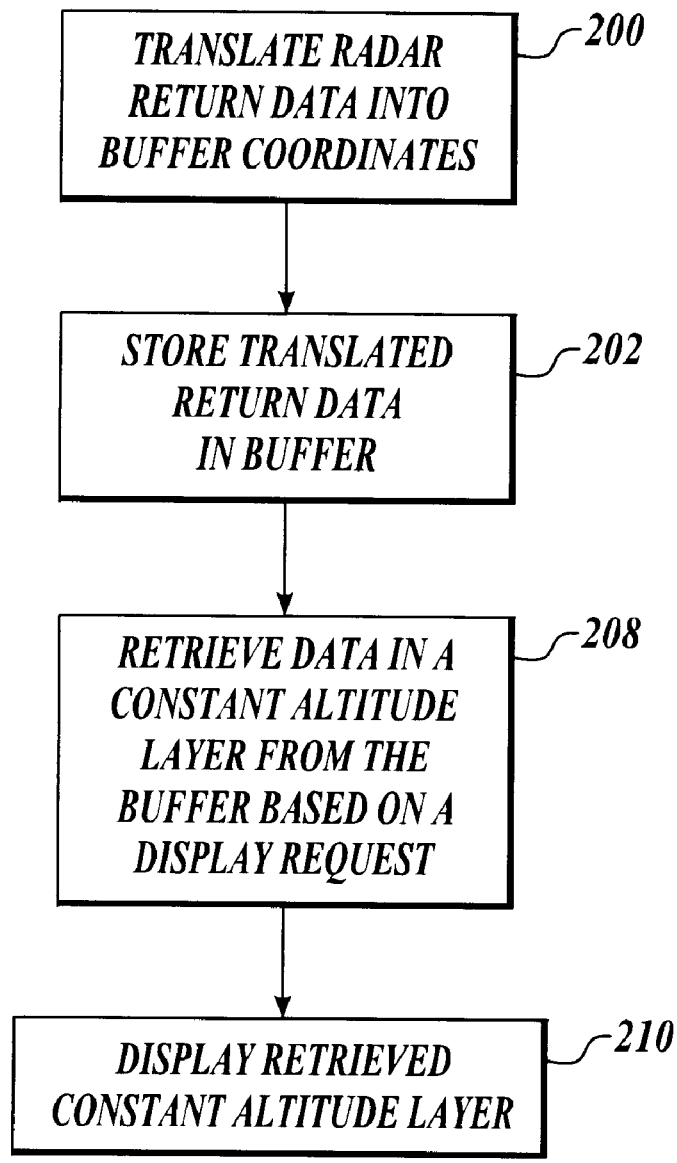
FIGS. 6 and 7 are flow diagrams for generating a constant altitude display image, such as that shown in FIG. 5.
Figure 7:
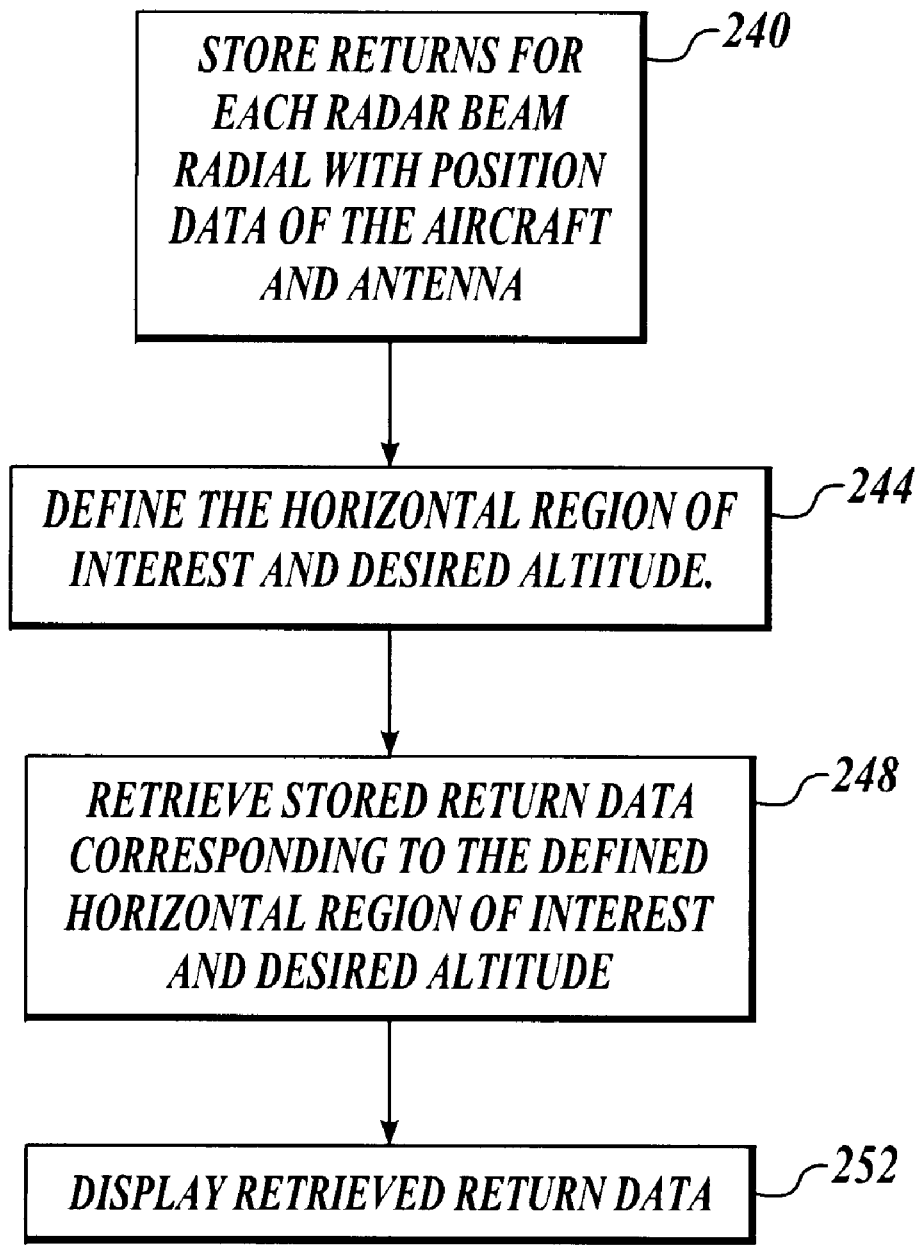

FIGS. 6 and 7 illustrate methods for generating a constant altitude display, such as that shown above in FIGS. 4 and 5. FIG. 6 shows a process that uses a buffer that is relational to the earth (airspace over the earth). First, at block 200, the radar return data at each radar beam radial is translated into buffer coordinates. Then, at block 202, the translated radar return data is stored in a three-dimensional buffer. The storage locations (voxels) of the three-dimensional buffer are based on altitude above the earth and aircraft position. At block 208, the processor 42 retrieves data stored in a constant altitude layer corresponding to a request to display return data from a certain altitude layer. Finally, at block 210, an image of the retrieved data is generated and displayed on the display device.

FIG. 7 shows a process that uses a three-dimensional buffer. In one embodiment, the buffer is curved to match the surface of the earth (so the earth can be considered flat) and radar return data of a radar sweep is curved through the buffer. In another embodiment, the buffer is referenced to the airspace around the aircraft, the earth is curved through the buffer and the radar return data corresponds to a cone of space traveling in a straight line. First, at block 240, the radar return data for each radar radial scan and position data of the aircraft and antenna are stored in a three-dimensional buffer. Next, at block 244, the horizontal region of interest (range and azimuth) and desired altitude are defined by the user or by a setting in the processor 42. The result of block 244 defined in buffer coordinates is a curved surface that exhibits a constant altitude above mean sea level (MSL). At block 248, the processor 42 retrieves return data stored in the buffer according to the defined horizontal region and desired altitude (curved surface). The step at block 248 is performed by extracting stored return data that corresponds to a calculated intersection between the curved surface and the three-dimensional buffer. Finally, at block 252, an image of the retrieved stored radar return data is generated and displayed on the display device 44.

Figure 8:
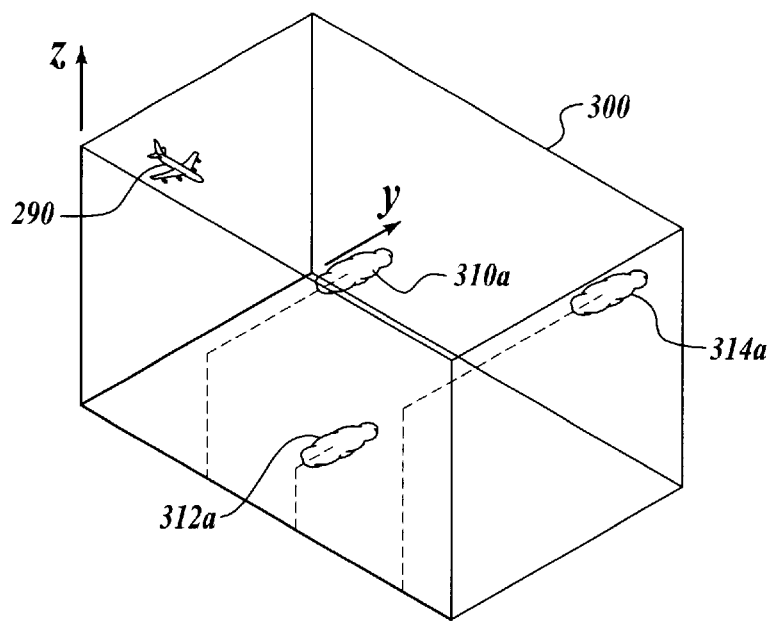
FIG. 8 is a perspective view of a three-dimensional buffer with multiple hazards.
Figure 9:
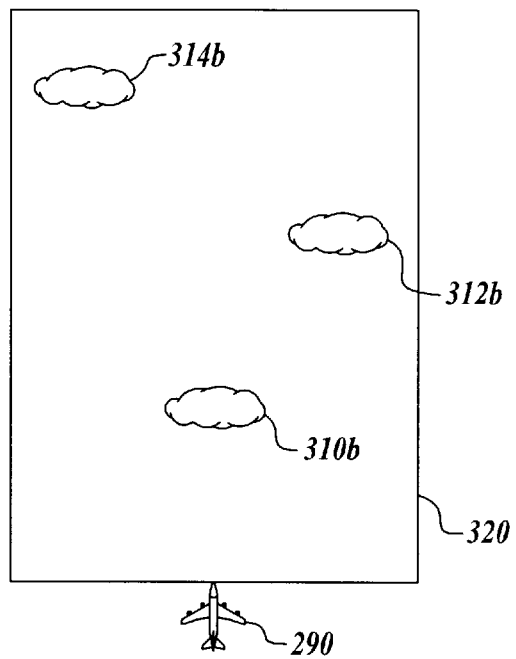
FIG. 9 is a plan view of all hazards within a range of altitudes retrieved from the three-dimensional buffer shown in FIG. 8.

FIG. 8 illustrates a perspective view of a three-dimensional buffer 300 that includes multiple weather hazards that are at various altitudes and distances from an airplane 290. In this embodiment the buffer 300 is relational to the earth or the aircraft. In an alternate embodiment, all the hazards in a volume of space around the aircraft are displayed. For example, a first group of weather hazard return data 310*a* exists in the three-dimensional buffer 300 at 80–90 nautical miles (nm) from the aircraft and at 23–24,000 ft. A second set of weather hazard return data 312*a* exists in the three-dimensional buffer 300 at 100–110 nm from the aircraft 290, and 14–15,000 ft. Finally, a third stored set of weather hazard return data 314*a* is stored in the three-dimensional buffer 300 at 200–210 nm from the airplane 290 and 27–28,000 ft. In this embodiment, the pilot first selects a range of distances from the aircraft (0–250 nm) and a range of altitudes (10,000–30,000 ft.) using the user interface 48. Then, the processor 42 retrieves all weather information within the selected ranges and generates a plan view of all that information. FIG. 9 illustrates an example plan view image 320 generated by the processor 42 based on the situation shown in FIG. 8. The processor 42 in this example collapses all the information within the selected altitude range into a single image. In other words, the processor 42 selects the highest return data in the voxels in each vertical column of voxels in the three-dimensional buffer 300 within the selected ranges. Each vertical column of voxels preferably corresponds to a column along common x, y coordinates. Image objects 310*b*, 312*b*, and 314*b* are generated and displayed because the corresponding stored return data 310*a*, 312*a*, and 314*a* are the strongest return data at the corresponding voxel columns.

Figure 10:
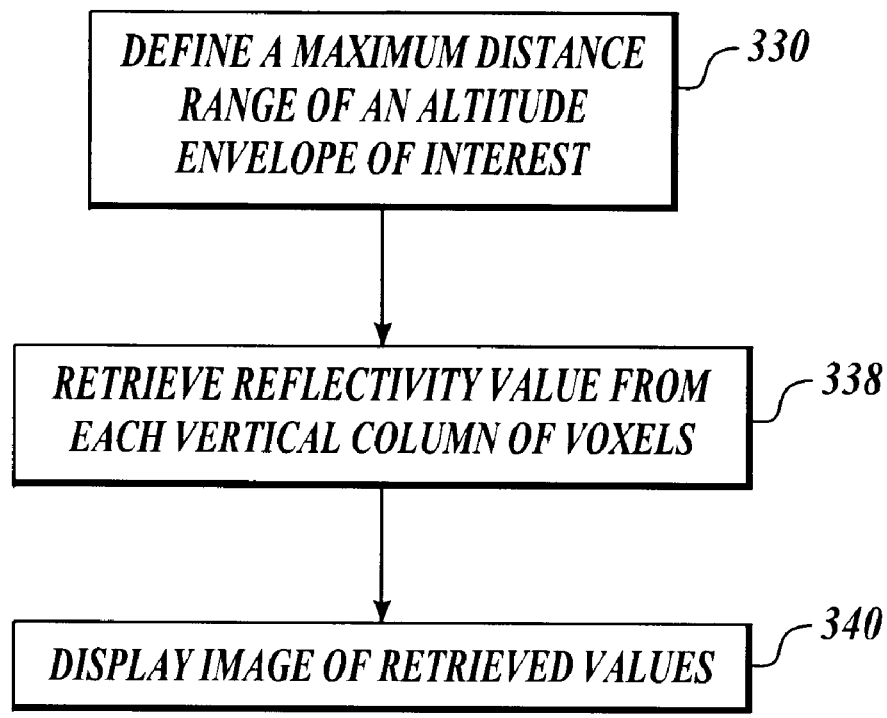
FIG. 10 is a flow diagram for generating an all hazard image as shown in FIG. 9.

FIG. 10 illustrates a flow diagram for generating a display as shown in FIGS. 8 and 9. First, at block 330, the pilot using the user interface device 48 defines a range envelope and an altitude envelope of interest. Next, at block 338, the processor 42 retrieves the maximum reflectivity value/radar return data within each vertical column of voxels between the determined altitude envelope and below the defined maximum distance. Then, at block 340, the processor generates a plan view image of the retrieved values and displays the image on the display device 48. The present invention may also retrieve stored data based on a median value or some non-linear function based on intensity. The altitude limits may be referenced to the aircraft altitude or the aircraft's flight plan and do not have to be constant over range.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A weather display method comprising:
retrieving radar return data stored in voxels in a three-dimensional buffer that corresponds to an altitude, wherein the radar return data having been stored in the three-dimensional buffer according earth coordinates and earth curvature;
generating an image of the retrieved radar return data; and
displaying the generated image on a display devices,
wherein each layer of voxels in the three-dimensional buffer corresponds to a constant altitude above mean sea level of the earth.

2. The method of claim 1, wherein the altitude used in retrieving radar return data is determined relative to aircraft's altitude above the earth.

3. The method of claim 1, wherein the altitude used in retrieving radar return data is selected using a user interface device.

4. A weather display method comprising:
retrieving radar return information stored in voxels from a three-dimensional buffer based on a range of altitudes; and
displaying the retrieved radar return information on a display device,
wherein the radar return data having been stored in the three-dimensional buffer according earth coordinates and earth curvature, and each layer of voxels in the three-dimensional buffer corresponds to a constant altitude above mean sea level of the earth.

5. The method of claim 4, wherein displaying comprises displaying the retrieved radar return information above a threshold value.

6. The method of claim 4, wherein the range of altitudes is selected using a user interface device.

7. A weather display system comprising:
a memory configured to store radar return data in voxels in a three-dimensional buffer based on earth coordinates and earth curvature;
a processor coupled to the memory, the processor comprising:
a first component configured to retrieve radar return data stored in the three-dimensional buffer that corresponds to an altitude; and
a second component configured to generate an image of the retrieved radar return data; and
a display device coupled to the processor configured to display the generated image,
wherein each layer of voxels in the three-dimensional buffer corresponds to a constant altitude above mean sea level of the earth.

8. The system of claim 7, wherein the first component is configured to generate the altitude based on aircraft's altitude above the earth.

9. The system of claim 7, further comprising a user interface coupled to the processor and configured to select the altitude used by the first component.

10. A weather radar system comprising:
a memory for storing radar return data in voxels in a three-dimensional buffer based on earth coordinates and earth curvature;
a processor coupled to the memory, the processor comprising:
a first component configured to retrieve radar return data stored in the three-dimensional buffer based on one or more ranges of altitudes; and
a second component configured to generate an image of the retrieved radar return data; and
a display device coupled to the processor configured to display the generated image,
wherein each layer of voxels in the three-dimensional buffer corresponds to a constant altitude above mean sea level of the earth.

11. The system of claim 10, further comprising a user interface coupled to the processor and configured to allow a user to select the one or more ranges of altitudes.

12. The system of claim 10, the second component is configured to display the retrieved radar return information above a threshold value.

13. weather display computer program product residing on a computer readable medium, the computer program product comprising:
a first component configured to store radar return data in voxels in a three-dimensional buffer based on earth coordinates and earth curvature;
a second component configured to retrieve radar return data stored in the three-dimensional buffer that corresponds to an altitude; and
a third component configured to generate an image of the retrieved radar return data,
wherein each layer of voxels in the three-dimensional buffer corresponds to a constant altitude above mean sea level of the earth.

14. The product of claim 13, wherein the three-dimensional buffer is relational to earth coordinates.

15. The product of claim 13, wherein the second component is configured to generate the altitude based on aircraft's altitude above the earth.

16. The product of claim 13, further comprising a user interface component configured to allow a user to select the altitude used by the second component.

17. A weather radar computer program product residing on a computer readable medium, the computer program product comprising:
a first component configured to store radar return data in voxels in a three-dimensional buffer based on earth coordinates and earth curvature;
a second component configured to retrieve radar return data stored in the three-dimensional buffer based on one or more ranges of altitudes; and
a third component configured to generate an image of the retrieved radar return data,
wherein each layer of voxels in the three-dimensional buffer corresponds to a constant altitude above mean sea level of the earth.

18. The product of claim 17, further comprising a user interface component coupled to the second component and configured to allow a user to select the one or more ranges of altitudes.

19. The system of claim 17, the third component is configured to display th retrieved radar return information above a threshold value.

20. A weather display method comprising:
storing weather radar return data from a weather radar system in an aircraft in a three-dimensional buffer, the buffer includes voxels, wherein each voxel stores a reflectivity value;
determining the maximum reflectivity values for each vertical column of voxels within a predefined range of distances from the aircraft;
generating a top plan image based on the determined maximum reflectivity values; and
displaying at least a portion of the generated top plan image.

* * * * *